United States Patent [19]
Pierce

[11] 3,842,378
[45] Oct. 15, 1974

[54] DOUBLE CLUTCH FOR VEHICLE AIR CONDITIONING COMPRESSOR

[75] Inventor: William C. Pierce, Dallas, Tex.

[73] Assignee: Pitts Industries, Inc., Dallas, Tex.

[22] Filed: July 20, 1973

[21] Appl. No.: 380,985

[52] U.S. Cl............ 335/220, 192/84 A, 192/84 PM
[51] Int. Cl............................................... H01f 7/08
[58] Field of Search ........... 335/229, 230, 220, 279, 335/281; 192/84 AA, 84 B, 84 PM, 84 A

[56] References Cited
UNITED STATES PATENTS

| | | | |
|---|---|---|---|
| 2,612,248 | 9/1952 | Feiertag | 192/84 PM |
| 2,875,876 | 3/1959 | Rudisch | 192/84 A |
| 2,886,149 | 5/1959 | Baermann | 192/84 PM X |

Primary Examiner—G. Harris
Attorney, Agent, or Firm—Clarence A. O'Brien; Harvey B. Jacobson

[57] ABSTRACT

A compressor driven by a vehicle engine through an electromagnetically engaged clutch, is alternatively driven by an electric motor through a permanent magnet coupling that is rendered operative when the clutch is disengaged. An axially displaceable armature common to both the clutch and the coupling, conducts magnetic flux emitted from the permanent magnets of the coupling and the electromagnetic coil assembly of the clutch along a common flux path.

13 Claims, 5 Drawing Figures

DOUBLE CLUTCH FOR VEHICLE AIR CONDITIONING COMPRESSOR

This invention relates to magnetically controlled transmission of power to a load such as a compressor.

A particular problem arises in the drive of a vehicle accessory load such as a compressor from two independent power sources such as the vehicle engine and an electric motor. In such installations, the compressor associated with the vehicle air conditioner is driven by the vehicle engine while in operation through a pulley and an electromagnetically engaged clutch. Continued operation of the air conditioning system while the vehicle engine is shut down, may be continued by drive of the compressor from an electric motor through a second clutch according to certain power train arrangements heretofore proposed. Such arrangements often require separate means for effecting engagement and disengagement of each of the two clutches. This results often in support of rotatable parts by bearings subject to high speed wear during vehicle operation even though some of the rotatable parts thereof are inactive. Also, the structural arrangement of parts becomes quite complex in order to insure proper and timely engagement and disengagement of each of the two clutches. It is therefore an important object of the present invention to provide a magnetically controlled transmission engaging system through which the accessory load of a vehicle may be alternatively driven from the vehicle engine when in operation or from another power source such as an electric motor while the vehicle is parked and the engine shut down.

In accordance with the present invention, the driven load is connected to the hub of an axially displaceable armature positioned axially between a pair of drive members which are respectively driven from two separate power sources such as the vehicle engine and an electric motor. An electromagnetic coil assembly is operatively mounted in relation to one of the drive members so as to generate a magnetic field and thereby magnetically attracting the armature into engagement therewith against the bias of a spring system. When the magnetic coil assembly is de-energized, the armature is held in engagement with the other drive member by means of permanent magnets embedded therein and from which magnetic fields extend establishing a magnetic coupling between the other drive member and the armature. A common flux path is established through the armature for the magnetic fields emitted by both the permanent magnets and the electromagnetic coil assembly, these magnetic fields opposing each other causing the armature to be repelled from the drive member with which it is otherwise magnetically coupled whenever the electromagnetic coil assembly is activated to effect electromagnetic clutching of the engine driven drive member to the load.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
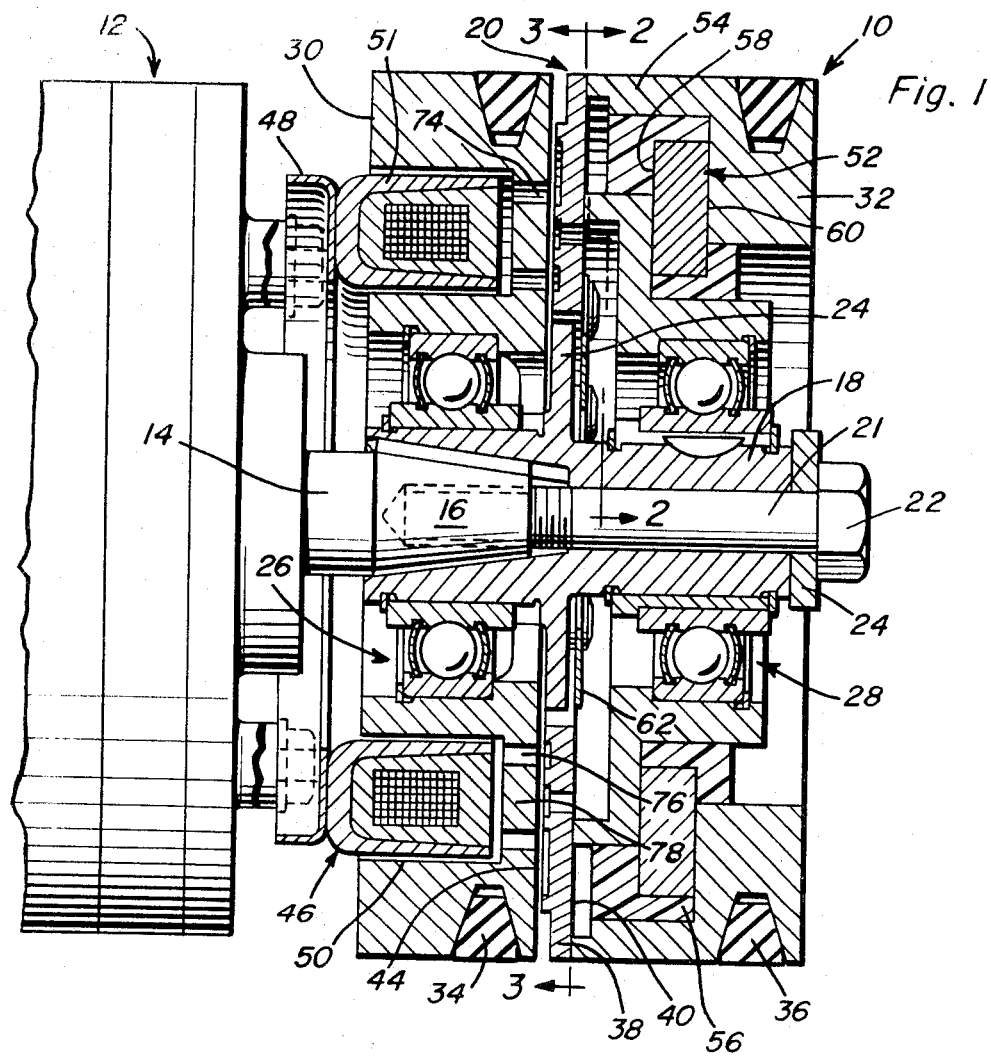
FIG. 1 is a side sectional view through a double clutch assembly constructed in accordance with the present invention.

Referring now to the drawings in detail, the clutch assembly of the present invention generally referred to in FIG. 1 by reference numeral 10, is adapted to alternatively transmit power from two different power sources such as a vehicle engine and an electric motor to a common vehicle accessory load such as a compressor 12. The power shaft 14 of the compressor accordingly extends into the clutch assembly and is provided with a tapered end portion 16 splined to an axially elongated hub 18 of an armature assembly generally referred to by reference numeral 20. The compressor shaft 14 is held assembled to the hub by means of an elongated fastener bolt 21 threadedly received within the end portion 16 of the compressor shaft and having a head 22 abutting a washer 24 held in engagement with the axial end of the hub 18. Mounted on the hub on opposite axial sides of a mounting flange 24, are bearing assemblies 26 and 28 for rotationally supporting a pair of drive pulley members 30 and 32. The pulley member 30 is adapted to be drivingly connected to the vehicle engine through pulley belt 34 while a pulley belt 36 drivingly connects the pulley member 32 to the electric motor, the pulley members 30 and 32 forming part of the clutch mechanism 10 together with the armature assembly 20.

The pulley members 30 and 32 are rotatably mounted on the hub 18 by the bearing assemblies in fixed axially spaced relationship to each other in order to form an axial gap therebetween that is a little wider than the thickness of the armature assembly 20. The armature assembly includes a radially outer, axially displaceable portion 38 that is normally engaged on one axial side 40 with an engaging axial end face of the pulley member 32, the portion 38 of the armature being displaceable axially into engagement with the friction end face 44 on the pulley member 30 by means of an electromagnetic coil assembly 46 which is fixedly mounted by the frame 48 bolted to the housing of the compressor. The coil assembly 46 projects into an annular cavity 50 formed in the pulley member 30 and is of a conventional construction. The electromagnetic coil assembly is energized in a manner well known by those skilled in the art whenever the vehicle engine is in operation and when so energized, generates a magnetic field that extends from its casing 51 made of material having a low magnetic reluctance property. The pulley members 30 and 32 are also made of a material having a low magnetic reluctance in order to permit the establishment of magnetic fields therein. Also, the axially displaceable portion 38 of the armature assembly is made of a material having low magnetic reluctance.

Figure 2:
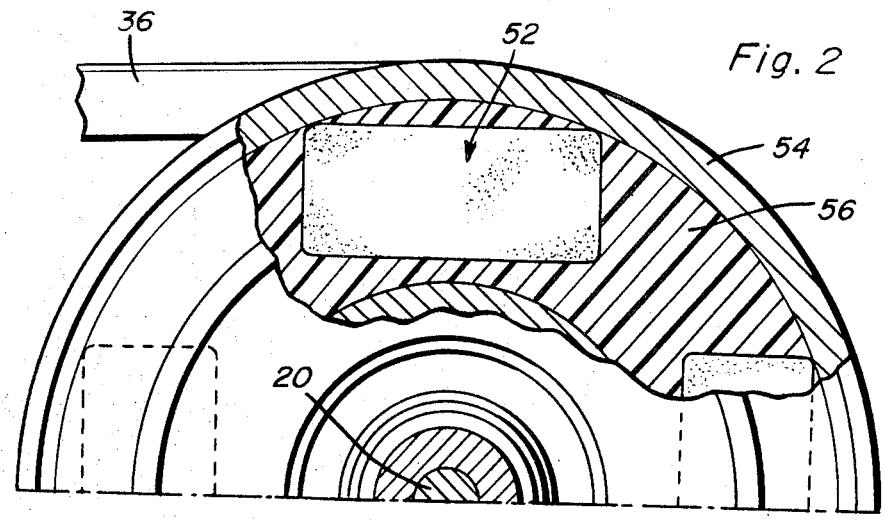
FIG. 2 is a partial transverse sectional view with parts broken and shown in section taken substantially through a plane indicated by section line 2—2 in FIG. 1.

The pulley member 32 has embedded therein, a plurality of permanent magnets 52 of a ceramic type. Any suitable number of such magnets are circumferentially spaced as more clearly seen in FIG. 2 and are rectangular in shape oriented in chordal relationship to a circular rim portion 54 of the pulley member. The permanent magnets are encapsulated within the epoxy bonding material 56 occupying the annular cavity within the pulley member within which the permanent magnets are mounted. Further, the permanent magnets are orientated so that flux emitting faces 58 and 60 emit flux in an axial direction.

Figure 3:
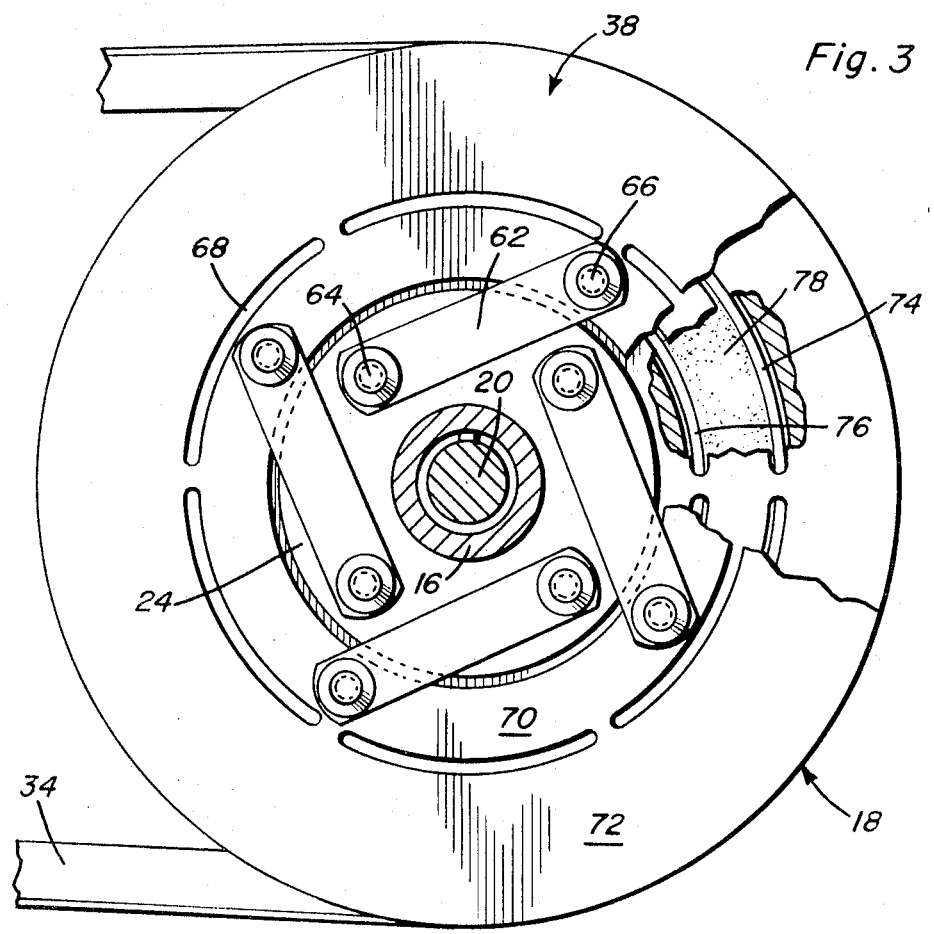
FIG. 3 is a transverse sectional view with parts broken away taken substantially through a plane indicated by section line 3—3 in FIG. 1.

Referring now to FIGS. 1 and 3, the armature assembly 20 is of a thickness which is slightly less than the axial spacing between the pulley members 30 and 32 so that the axially movable disc portion 38 thereof, may be displaced from engagement with one confronting face of the pulley member 32 as shown in FIG. 1, into engagement with the friction face 44 on the other pulley member 30. The disc portion 38 is coupled to the mounting flange portion 24 by means of a plurality of leaf springs 62 pivotally connected at opposite ends by connectors 64 to the radially outer portion of the mounting flange 24 on one axial side and by means of pivot connectors 66 to the radially inner portion of the movable disc portion 38 on the same axial side. The leaf spring elements 62 will therefore yieldably resist axial movement of the movable disc portion 38 into engagement with the pulley member 30, the disc portion 38 being normally held in engagement with the pulley member 32 by the attractive force of the permanent magnets 52.

The armature disc portion 38 is furthermore provided with a plurality of closely spaced, circumferential slots 68 adapted to magnetically separate the radially inner portion 70 of the armature disc portion 38 and the radially outer portion 72. Similarly, circumferential slots 74 and 76 are formed in the web portion 78 of the pulley member 30 in order to magnetically separate radially inner and outer portions of the pulley member.

Figure 4:
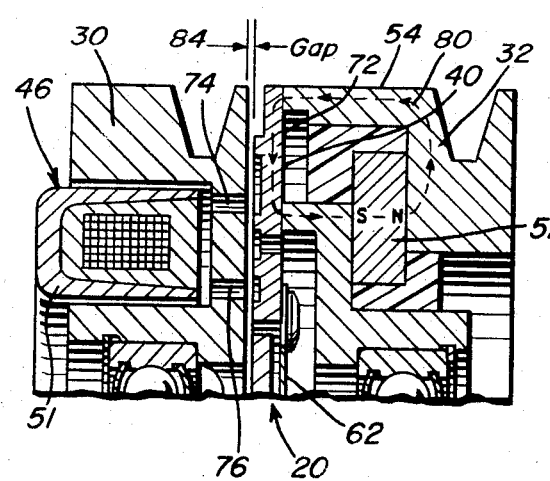
FIG. 4 is a partial side sectional view through the clutch assembly shown in one operative condition.
Figure 5:
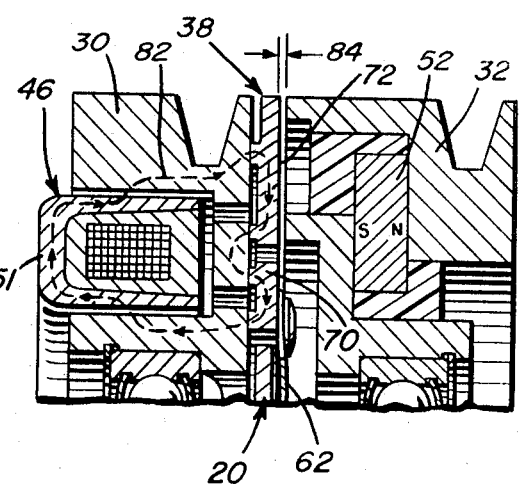
FIG. 5 is a partial side sectional view through the clutch assembly shown in another operative condition.

As diagrammatically shown in FIG. 4, each of the permanent magnets 52 establishes a magnetic field characterized by a flux path 80 that extends from the permanent magnet through the material of the pulley member 32 and through the radially outer portion 72 of the armature disc portion 38. Thus, with the electromagnetic coil assembly 46 de-energized, the armature assembly 20 will couple the pulley member 32 to the compressor shaft to which the armature assembly is connected. When the electromagnetic assembly is energized as shown in FIG. 5, the magnetic field produced thereby, which is characterized by the flux path 82, extends through the material of the pulley member 30 and through both the radially outer and inner portions 72 and 70 of the armature disc portion. Thus, a common flux path is established through the radially outer portion 72 of the armature assembly for both the magnetic fields of the permanent magnets 52 and the magnetic field of the electromagnetic coil assembly 46. The magnetic field associated with the electromagnetic coil assembly 46 is radially orientated as shown in FIG. 5 in the same direction as that of the magnets 52 so that the magnetic fields repel each other resulting in the displacement of the armature assembly into engagement with the pulley member 30 under the greater attractive force of the magnetic field generated by the electromagnetic assembly 46. The thickness of the armature assembly is such that only a single flux path can be established therethrough in order to effect repulsive displacement of the armature assembly from engagement with the pulley member 32. The spacing gap 84 between the armature assembly and the pulley members and the axial thickness of the armature assembly between the pulley members is such as to preclude establishment of two parallel flux paths through the armature assembly. This results in positive axial displacement of the armature assembly upon energization of the electromagnetic coil assembly 46 against the bias of the leaf springs 62 and avoids the necessity for any additional power actuated return mechanism since deactivization of the electromagnetic coil assembly 46 will restore the attractive influence of the permanent magnets 52 on the armature assembly re-establishing a power coupling between the armature assembly and the pulley member 32.

As hereinbefore described, the clutch mechanism is particularly useful in transmitting torque to a compressor shaft as the load, from an electric motor under conditions that do not require as much torque as conditions under which the vehicle engine is in operation when torque is transmitted through the electromagnetically actuated clutch. The flux paths of the magnetic fields are directed through portions of the armature assembly and one of the drive pulley members by magnetically separated radially inner and outer portions by use of circumferential slots which would be interconnected by remaining spoke portions permitting some tolerable magnetic leakage. The radially inner and outer portions of the material through which the magnetic flux paths extend, could be more efficiently designed by interconnecting the radially inner and outer portions by separate spokes made of non-magnetic materials. Also, the number of magnetic poles utilized for the coupling and clutch may be varied to meet different requirements. Still further, the magnetically controlled torque transmitting arrangement described could be utilized for clutch and brake installations rather than the double clutch embodiment specifically described.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a pair of axially spaced members and an armature axially displaceable into engagement with said members alternatively, torque transmitting control means comprising a pair of magnetic flux emitting devices respectively establishing mutually repelling magnetic fields extending from said axially spaced members on opposite axial sides of said armature, means respectively mounting said flux emitting devices within the axially spaced members for establishing a flux path through said armature common to both of said magnetic fields, and means for selectively collapsing one of the magnetic fields extending from one of the axially spaced members to effect axial displacement of the armature into engagement with the other of the axially spaced members, said armature being dimensionally restricted in an axial direction to substantially confine the magnetic fields between the axially spaced members to the common flux path through the armature.

2. The combination of claim 1 wherein one of the flux emitting devices comprises electromagnetic means for effecting collapse of said one of the magnetic fields.

3. The combination of claim 2 wherein the other of the flux emitting devices is a permanent magnet embedded in the other of the axially spaced members.

4. The combination of claim 3 wherein both of said magnetic fields are radially polarized in the same direction through the armature to effect said mutually repelling relationship therebetween.

5. The combination of claim 4 wherein said armature includes magnetically separated, radially inner and outer portions through which one of the magnetic fields extends, the other of the magnetic fields extending through only one of the inner and outer portions of the armature along said common flux path.

6. The combination of claim 5 including spring means for yieldably opposing displacement of the armature into engagement with said one of the axially spaced members.

7. The combination of claim 1 wherein said armature includes magnetically separated, radially inner and outer portions through which one of the magnetic fields extends, the other of the magnetic fields extending through only one of the inner and outer portions of the armature along said common flux path.

8. The combination of claim 7 wherein both of said magnetic fields are radially polarized in the same direction through the armature to effect said mutually repelling relationship therebetween.

9. The combination of claim 8 including spring means for yieldably opposing displacement of the armature into engagement with said one of the axially spaced members.

10. The combination of claim 1 wherein both of said magnetic fields are radially polarized in the same direction through the armature to effect said mutually repelling relationship therebetween.

11. In combination with a pair of axially spaced members and an armature axially displaceable into engagement with said members alternatively, torque transmitting control means comprising a pair of magnetic flux emitting devices respectively establishing mutually repelling magnetic fields extending from said axially spaced members on opposite axial sides of said armature, means respectively mounting said flux emitting devices within the axially spaced members for establishing a flux path through said armature common to both of said magnetic fields, and means for selectively collapsing one of the magnetic fields extending from one of the axially spaced members to effect axial displacement of the armature into engagement with the other of the axially spaced members, said armature including magnetically separated, radially inner and outer portions through which one of the magnetic fields extends, the other of the magnetic fields extending through only one of the inner and outer portions of the armature along said common flux path.

12. The combination of claim 1 including spring means for yieldably opposing displacement of the armature into engagement with said one of the axially spaced members.

13. The combination of claim 1 wherein said axially spaced members are independently powered drivers, and including a driven member on which the armature is non-rotatably mounted.

* * * * *